(12) United States Patent
Dooley et al.

(10) Patent No.: US 7,979,723 B2
(45) Date of Patent: Jul. 12, 2011

(54) MOTION SENSOR ARRANGEMENT FOR POINT-OF-PURCHASE DEVICE

(75) Inventors: Christopher Dooley, New Cannan, CT (US); Paul Nielsen, Saratoga Springs, NY (US)

(73) Assignee: Clever Innovations, Inc., Saratoga Springs, NY (US)

( * ) Notice: Subject to any disclaimer, the term of this patent is extended or adjusted under 35 U.S.C. 154(b) by 134 days.

(21) Appl. No.: 12/080,231

(22) Filed: Apr. 1, 2008

(65) Prior Publication Data

US 2008/0215443 A1    Sep. 4, 2008

Related U.S. Application Data (63) Continuation-in-part of application No. PCT/US2007/070965, filed on Jun. 12, 2007.

(60) Provisional application No. 60/792,230, filed on Apr. 14, 2006, provisional application No. 60/888,040, filed on Feb. 2, 2007.

(51) Int. Cl.
*G06F 1/26* (2006.01)
*G06F 1/32* (2006.01)

(52) U.S. Cl. ........ 713/300; 713/320; 713/323; 713/324; 725/23; 725/42

(58) Field of Classification Search ................ 713/300, 713/320, 323, 324
See application file for complete search history.

(56) References Cited

U.S. PATENT DOCUMENTS

| | | | |
|---|---|---|---|
| 5,083,765 A | 1/1992 | Kringel | |
| 5,207,349 A | 5/1993 | Kringel | |
| 5,299,796 A | 4/1994 | Wooldridge | |
| 5,305,197 A | 4/1994 | Axler et al. | |
| 5,413,325 A | 5/1995 | Dubois et al. | |
| 5,472,289 A | 12/1995 | Kringel et al. | |
| 5,564,546 A | 10/1996 | Molbak et al. | |
| 5,620,079 A | 4/1997 | Molbak | |
| 5,944,219 A | 8/1999 | Emoff et al. | |
| 6,053,356 A | 4/2000 | Emoff et al. | |
| 6,079,081 A | 6/2000 | Padiak et al. | |
| 6,202,334 B1 | 3/2001 | Reynolds et al. | |
| 6,233,102 B1 | 5/2001 | Hogan, Jr. | |
| 2001/0028301 A1 | 10/2001 | Geiger et al. | |
| 2002/0054330 A1* | 5/2002 | Jinbo et al. | 358/1.15 |
| 2003/0115096 A1* | 6/2003 | Reynolds et al. | 705/14 |
| 2003/0195800 A1* | 10/2003 | Peters | 705/14 |
| 2005/0267804 A1* | 12/2005 | Lonsbury et al. | 705/14 |
| 2006/0190750 A1* | 8/2006 | Maggi et al. | 713/320 |
| 2007/0024845 A1 | 2/2007 | Essling et al. | |

\* cited by examiner

*Primary Examiner* — Thomas Lee
*Assistant Examiner* — Michael J Brown
(74) *Attorney, Agent, or Firm* — Michael Crilly, Esq.

(57) ABSTRACT

A motion sensor arrangement is presented for dispenser capable point-of-purchase devices. The invention includes one or more motion sensors and a power management circuit facilitating activation of visual and motion display elements and/or a dispensing mechanism. Motion sensors are attached to a shelf-mountable display unit and capable of determining the presence of a person within the vicinity of the device. Power management circuit communicates with the motion sensors and display elements, examples including light emitting diodes and motorized drive devices. The power management circuit activates one or more display elements to communicate queues to a person within visual range of the point-of-purchase device. The dispensing mechanism ejects a coupon or product information sheet when a person is sensed within the vicinity of the point-of-purchase device. The power management circuit causes display elements and dispensing mechanism to operate in different power modes based at least in part on the determination of the presence of a person by one or more motion sensors.

18 Claims, 10 Drawing Sheets

MOTION SENSOR ARRANGEMENT FOR POINT-OF-PURCHASE DEVICE

CROSS REFERENCE TO RELATED APPLICATIONS

This application is a Continuation-In-Part (CIP) application to pending PCT Application No. PCT/US2007/070965 filed Jun. 12, 2007 which itself claims priority to U.S. Non-Provisional application Ser. No. 11/735,317 filed Apr. 13, 2007, U.S. Non-Provisional application Ser. No. 11/735,170 filed Apr. 13, 2007, and U.S. Non-Provisional application Ser. No. 11/735,118 filed Apr. 13, 2007, each of which claims priority to U.S. Provisional Application No. 60/792,230 filed Apr. 14, 2006, and U.S. Provisional Application No. 60/888,040 filed Feb. 2, 2007, each of the applications being hereby incorporated by reference in their entirety.

FEDERALLY SPONSORED RESEARCH AND DEVELOPMENT

None.

BACKGROUND OF THE INVENTION

1. Field of the Invention

The present invention relates to a point-of-purchase device capable of either dispensing a coupon, product information sheet, or the like or activating one or more display elements. More specifically, the present invention is a motion sensor arrangement, including sensors and power management circuitry for use with a shelf-mountable display device, which is capable of activating lights, message panel, movable display element, and/or a dispenser of consumer relevant information after sensing the presence of a person, and thereafter returning lights, panel, movable display element, and/or powered dispenser to a power savings mode.

2. Description of the Related Art

Shelf-mountable, point-of-purchase displays include compact devices configured for attachment to shelving in supermarkets or the like so as to encourage the purchase of a product by a shopper. Exemplary devices include the coupon dispenser described by Kringel in U.S. Pat. No. 5,083,765, the advertising display mounting device described by Kringel in U.S. Pat. No. 5,472,289, and the Shelfvision Take One display with optional removable product information sheets and coupons sold by SmartSource Marketing, A Division of News Corporation.

Figure 1:
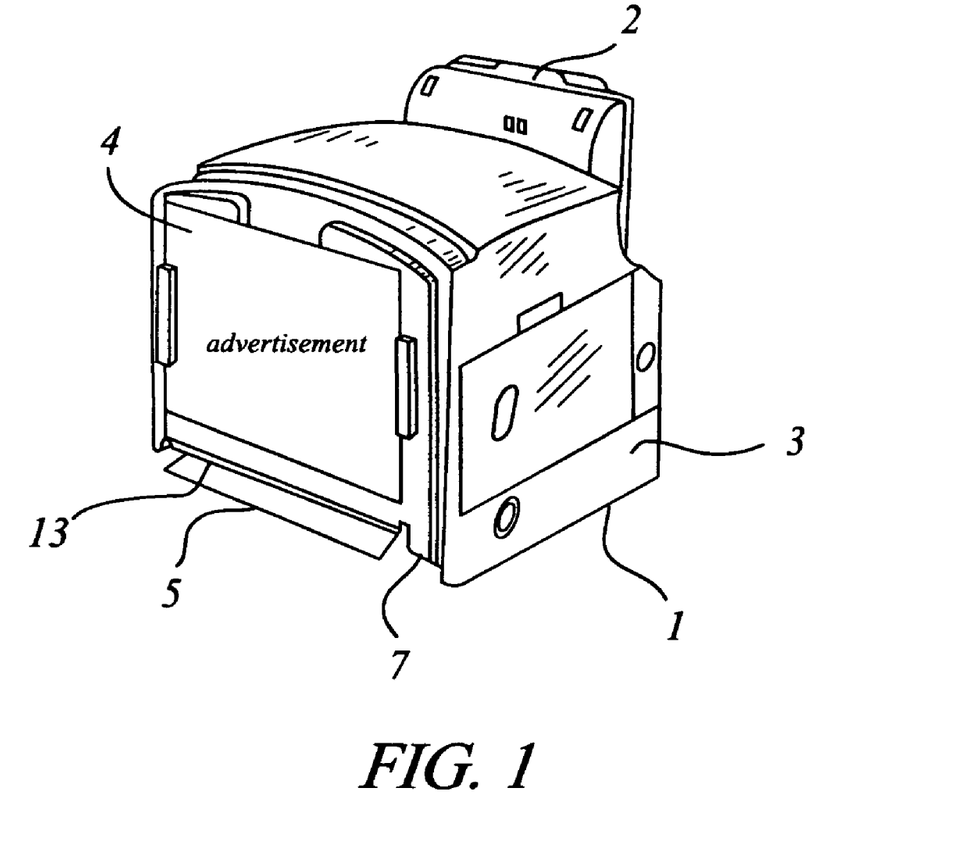
FIG. 1 is a perspective view of a display unit capable of dispensing coupons or the like via a motorized dispenser.

FIG. 1 shows another shelf-mountable display unit 1 sold by News America Marketing under model no. ICMA015. The unit is attachable to a shelf via a shelf clip 2 and includes a housing 7 disposed about either a manual or motorized coupon ejection mechanism. Consumers are attracted to the shelf-mountable display unit 1 via a changeable decorative cover 3, a sample coupon 4 mounted to the front face of the housing 7, and a coupon 5 partially extended from a slot 13 within the housing 7.

Presently known devices have several disadvantages caused by their simplistic operational designs. Display units are unable to sense the nearby presence of a consumer and therefore incapable of automatically dispensing a coupon or the like and activating light or motion display elements in a controlled and energy efficiency manner. Accordingly, the passive functionality of shelf-mounted display units discourages interactions with shoppers. Furthermore, power consumption by powered devices is not optimal due to the absence of power conservation hardware and software. The disadvantages in total indicate that presently known devices are of marginal benefit in most retail settings Accordingly, what is not appreciated in the related art is the need for a motion sensor arrangement that automatically activates visual queues and/or dispenses coupons or the like after sensing the presence of a consumer so as to overcome the detriments noted above.

SUMMARY OF THE INVENTION

An object of the present invention is to provide a motion sensor arrangement that automatically activates visual queues and/or dispenses coupons or the like after sensing the presence of a consumer while minimizing power consumption.

The present invention is a motion sensor arrangement for a point-of-purchase device including at least one motion sensor and a power management circuit facilitating activation of visual display elements and dispensing mechanism.

Motion sensors are attached to a shelf-mountable display unit and capable of determining the presence of a person within the vicinity of the point-of-purchase device. Furthermore, the shelf-mountable display unit is capable of dispensing optional coupons or product information sheets either manually or automatically.

The power management circuit communicates with the motion sensors and display elements, examples including, but not limited to, light emitting diodes, panel of light emitting diodes, and motorized display unit which moves in a fixed or random fashion. In some embodiments, the power management circuit communicates with a dispenser mechanism for coupons or the like. The power management circuit activates at least one display element to communicate a visual queue, including motion-based queues, to a person within range of the point-of-purchase device. Also, the power management circuit causes at least one display element and/or dispenser mechanism to operate in different power modes based at least in part on the determination of the presence of a person by one or more motion sensors.

In some embodiments, a battery powered dispensing mechanism ejects a single coupon or product information sheet when a person is sensed by one or more motion sensors within the vicinity of the point-of-purchase device. The power management circuit causes the dispensing mechanism to operate in different power modes based at least in part on the determination of the presence of a person by one or more motion sensors.

The above and other objectives, features and advantages of the preferred embodiments of the present invention will become apparent from the following description read in connection with the accompanying drawings, in which like reference numerals designate the same or similar elements.

BRIEF DESCRIPTION OF THE DRAWINGS

The invention will now be described in more detail, by way of example only, with reference to the accompanying drawings, in which.

REFERENCE NUMERALS

1 Shelf-mountable display unit 18 Electrical lead
2 Shelf clip 19 Blinder housing
3 Decorative cover 17 Optical receiving element
4 Sample coupon 20 Cavity
5 Coupon 21 Lens
6 Display element 22 Micro-controller circuit
7 Housing 23 Wake up circuit
8 Adhesive layer 24 Motion sensor
9 Electrical lead 25 Display element
10 Motion sensor 26 Dispenser mechanism
11 Shelf-mountable display unit 27 Angle
12 Display element 28 Product information sheet
13 Slot 29 Drive device
14 Adjustable mounting bracket 30 Movable display element
15 Centerline 31 Light
16 Motion sensor assembly 32 Panel

DETAILED DESCRIPTION OF THE INVENTION

Reference will now be made in detail to several preferred embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words communicate, connect, couple, and similar terms with their inflectional morphemes do not necessarily denote direct and immediate connections, but also include connections through intermediary elements or devices.

Figure 2:
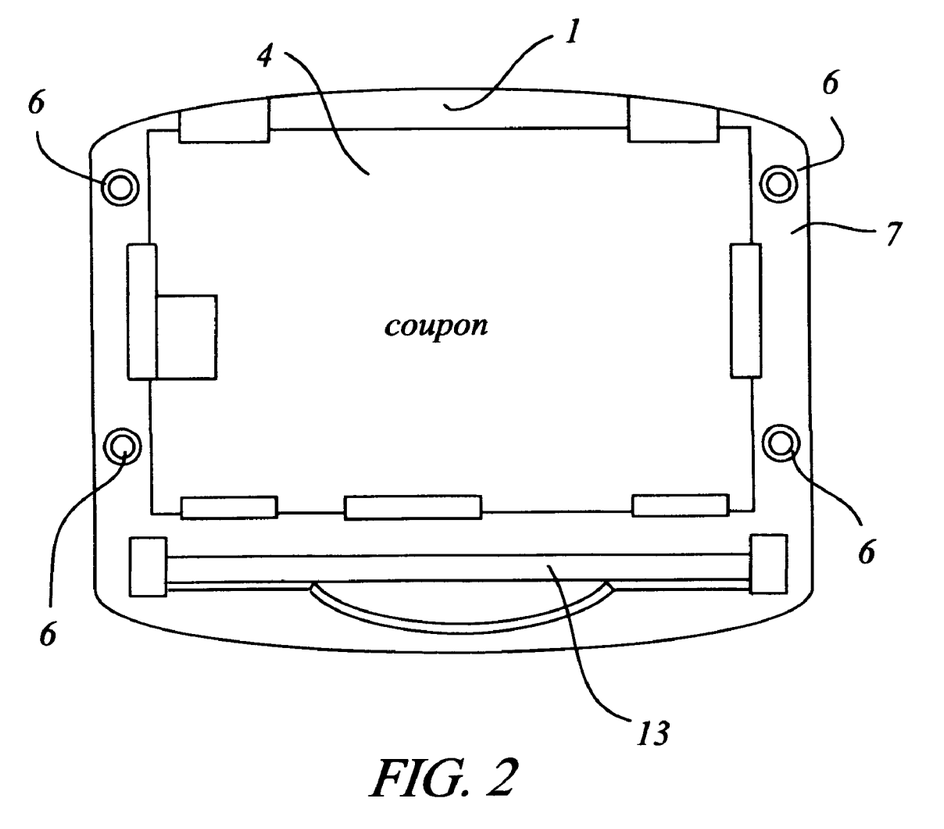
FIG. 2 is a front view of the shelf-mountable display unit having display elements disposed along a side thereof.
Figure 4:
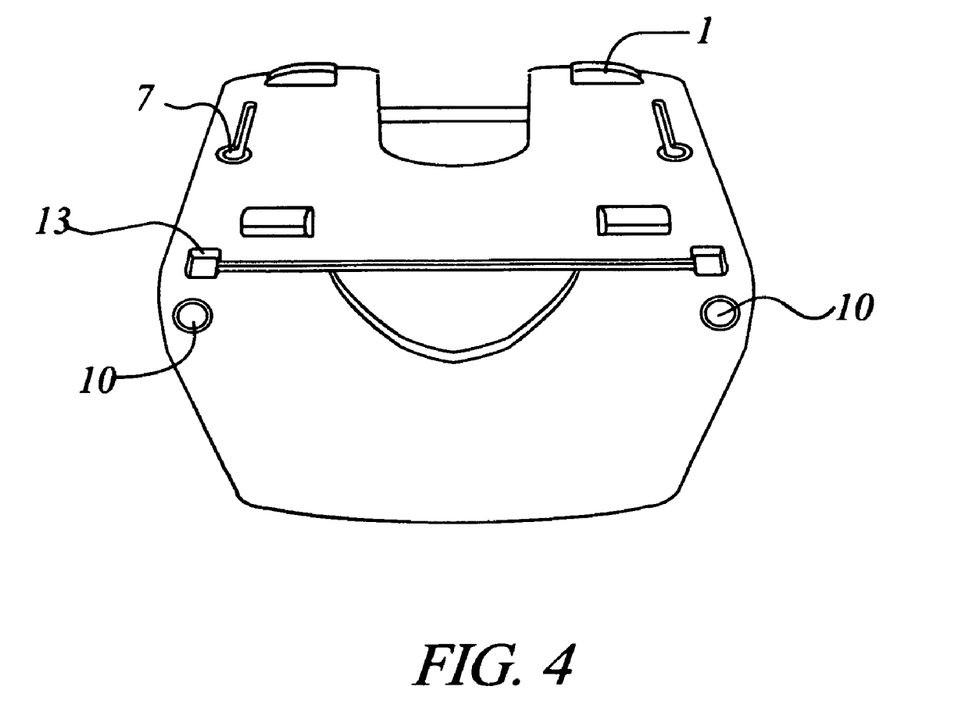
FIG. 4 is an elevation view of two sides of a shelf-mountable display unit showing a pair of motion sensors disposed along a side of the display unit.

Referring now to FIGS. 2 and 4, one embodiment of the motion sensor arrangement is shown including four display elements 6 and a pair of motion sensors 10 disposed along the shelf-mountable display unit 1 from FIG. 1. The housing 7 of shelf-mountable display unit 1 functions to support the internal mounting of several components known within the art, including a manually operable or motorized dispenser unit, capable of dispensing coupons or product information sheets, and a power supply. Furthermore, the housing 7 functions to support the mounting of display elements 6 and motion sensors 10 so that each is visible along the external surface of the shelf-mountable display unit 1 and electrically coupled to dispenser unit, power supply, and/or power management and control circuits within the housing 7.

Figure 3:
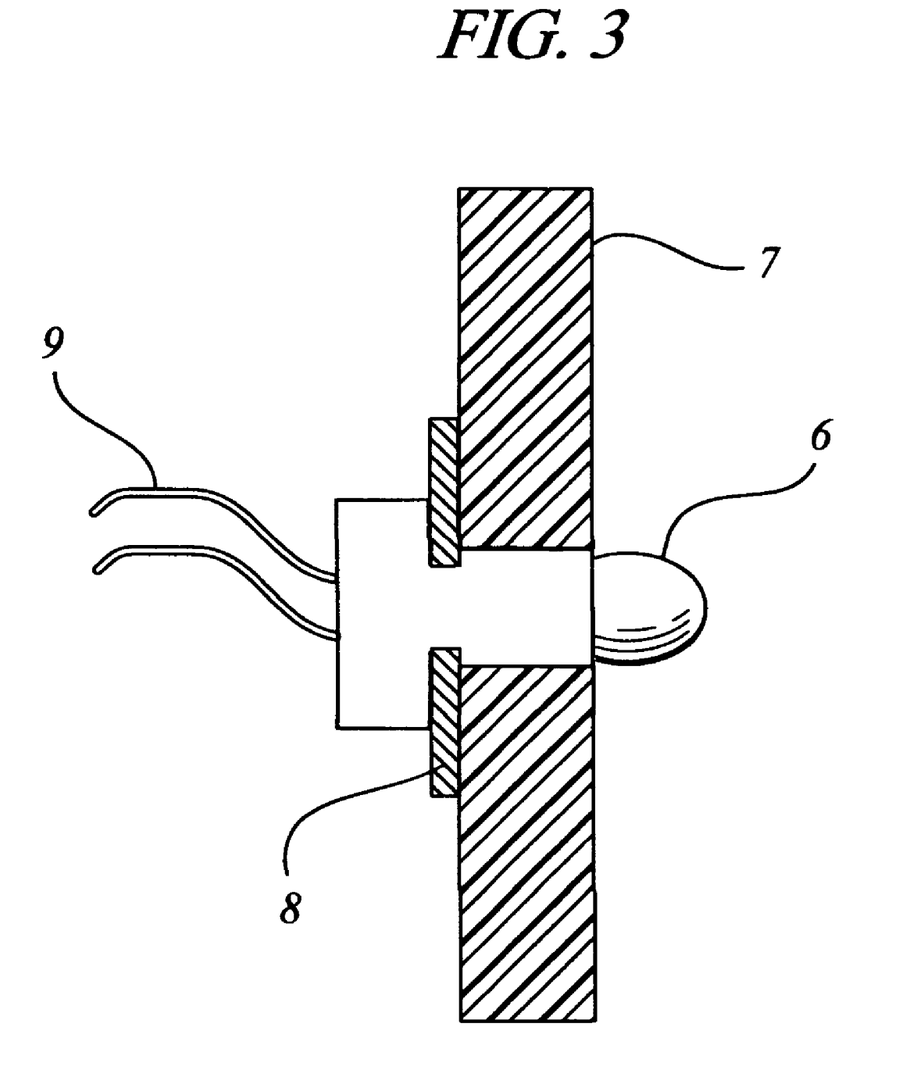
FIG. 3 is an enlarged partial section view of an exemplary display element attached to the outer housing of a shelf-mountable display unit.

Display elements 6 may include one or more light emitting diodes (LED) or any other low-voltage light source presently known or developed within the future suitable for the particular purpose herein. Each display element 6 could be mounted to the shelf-mountable display unit 1 so as to extend through and beyond a hole within the housing 7, as represented in FIG. 3. Each display element 6 may be attached to the housing 7 via an adhesive layer 8, also shown in FIG. 3, or mechanically attached thereto via fasteners or other elements understood in the art. Electrical leads 9 from the display element 6 are electrically connected to circuitry within the shelf-mountable display unit 1.

A variety of mounting arrangements are possible including the placement of display elements 6 along one or more sides of the housing 7. However, it is preferred for at least one display element 6 to be located along a surface of the housing 7 so that it is visible to a person passing within visual range of the shelf-mountable display unit 1. For example, FIG. 2 shows the placement of display elements 6 about a sample coupon 4 attached to a mounting structure along the front face of a shelf-mountable display unit 1 and above the slot 13 through which coupons or the like are partially ejected.

Display elements 6, including light emitting diodes, are activated by the presence of a consumer within the range of the motion sensors 10. A variety of functional schemes are possible for the activation and flashing of such elements. For example, one display element 6 could be powered to emit light for a pre-determined time interval, one example being 0.02 seconds, and immediately followed by all display elements 6 powered to emit light for another pre-determined time interval, one example being 0.5 seconds. The sequence of operation could be repeated until each display element 6 is singly powered and the pattern repeated. Also, the time interval of functionality could be limited to a pre-determined value, one example being 30 seconds, after which all display elements 6 are shut down and the device replaced into one or several power conservation modes.

Figure 6:
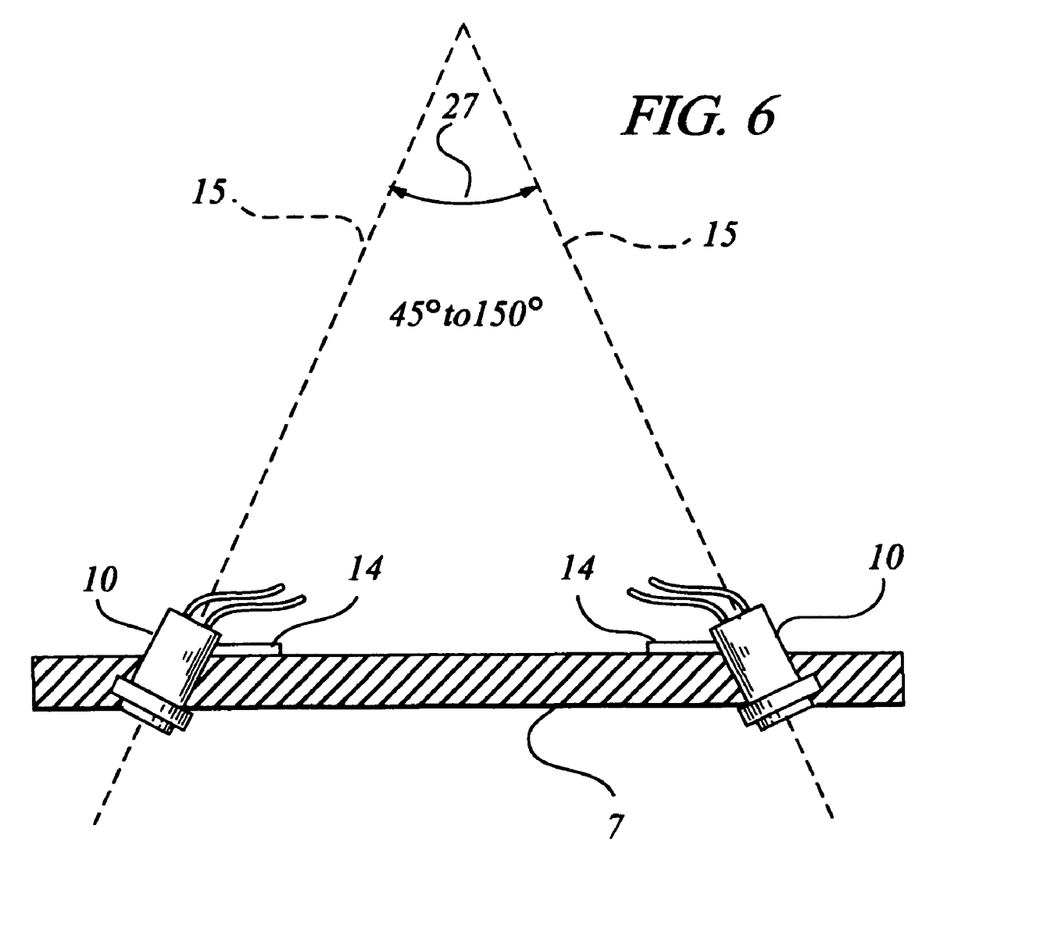
FIG. 6 is a partial section view of a non-limiting implementation of a pair of motion sensors within a shelf-mountable display unit.

Motion sensors 10 could include one or more elements which sense the presence of a person via light, heat, or other signature associated with matter. Each motion sensor 10 could be mounted to the shelf-mountable display unit 1 so as to extend through and beyond a hole within the housing 7, as represented in FIG. 6. Each motion sensor 10 may be attached to the housing 7 via an adhesive or mechanical means understood in the art. For example, FIG. 6 shows each motion sensor 10 having an adjustable mounting bracket 14 attached thereto which contacts the interior surface of the housing 7. It is likewise possible for one or more motion sensors 10 to be mounted directly to the exterior surface of the housing 7. The adjustable mounting bracket 14 is then adhesively bonded to or fastened to the housing 7.

The adjustable mounting bracketing 14 could be attached to the motion sensor 10 via a ratchet-type or hinge assembly which is fixed and securable via a mechanical fastener. The adjustable mounting bracket 14 allows for adjustments to the angle 27 between the centerlines 15 of paired arrangements of motion sensors 10, as represented in FIG. 6.

A variety of mounting arrangements are possible including the placement of motion sensors 10 along one or more sides of the housing 7. However, it is preferred for at least one motion sensor 10 to be located along a surface of the housing 7 so that it may detect movement anywhere within a selected range. For example, FIG. 4 shows the placement of motion sensors 10 along the lower edge of the front face of a shelf-mountable display unit 1 and adjacent to the slot 13 through which coupons or the like are ejected.

The detection range of a motion sensor arrangement is application dependent. The range may be, for example, anywhere from six feet to twelve feet. Some applications may require only one motion sensor 10 oriented nearly horizontal. Preferably, a pair of motion sensors 10 would be oriented 90 degrees to cover both directions of a store aisle as shoppers approach from either direction, but may be at any angle between 45 degrees and 150 degrees. Motion sensors 10 may be movable so that their angle and range are varied. This allows the device to be adjusted to work optimally in a given location. The device may be in an aisle of an unusual width or on an end cap of an aisle. Also, any number of motion sensors 10 in any arrangement suitable for detecting movement may be utilized. For example, a third motion sensor 10 could be added between two motion sensors 10. Such an arrangement would be useful for an aisle end cap placement to detect persons approaching anywhere in a range of 180 degrees around the device.

As an operational alternative, motion sensors 10 may detect only a shadow because they are motion only sensors that receive or watch for ambient light variations provided by overhead lighting in a store. As a result, using this type of sensor, the present invention detects only the shadow from a passing person but is highly efficient in power use when compared to infrared or radio frequency sensing devices which generate a signal and sense a corresponding bounce-back signal.

Figure 7:
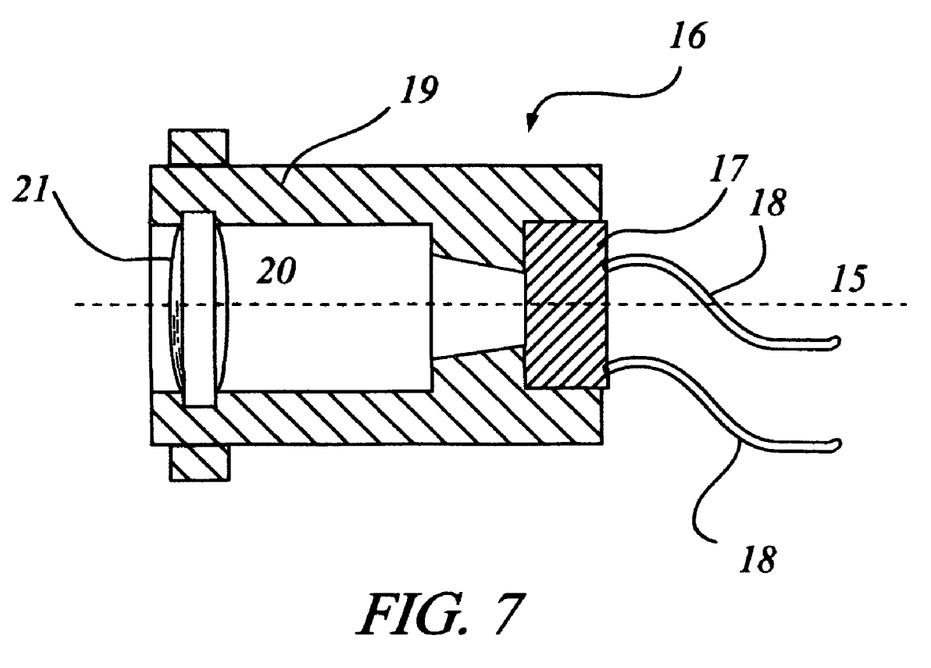
FIG. 7 is a section view of a motion sensor assembly according to one embodiment of the invention.

Each motion sensor 10 may be configured to enhance or limit its detection properties. One such exemplary motion sensor assembly 16 is shown in FIG. 7. The motion sensor assembly 16 includes a lens 21 in order to narrow and sharpen light within the detection range and thereby conserve power. The motion sensor assembly 16 also includes a blinder housing 19 and a low cost optical receiving element 17, preferably with low power consumption. The optical receiving element 17 measures the optical light that it receives and provides this information to a wake up circuit or some other integrated circuit in other embodiments. The optical receiving element 17 may be a photodiode, phototransistor, photo-resistor, cadmium sulfide cell sensor, or any other suitable optical based receiver that detects light.

The lens 21 could include a convex-shaped element that focuses light towards the optical receiving element 17. This feature improves the sensitivity and range of the optical receiving element 17 used alone without a lens 21, which may be as little as 1 to 4 feet and up to as much as 15 feet. However, the lens 21 is less sensitive to ambient light placement, such as store lighting, because it analyzes a beam of light much more accurately. The blinder housing 19, or different blinders in other embodiments, prevents outside light that should not be analyzed from reaching the optical receiving element 17. This arrangement allows only focused light from the lens 21 to reach the optical receiving element 17.

Referring again to FIG. 7, the blinder housing 19 may be composed of a thermally stable composition having a cavity 20 through which light focused by the lens 21 passes. The lens 21 could be secured to a channel or groove at the front end of the blind housing 19, as represented in FIG. 7. The optical receiving element 17 is housed within and secured to a likewise shaped cavity at the back end of the motion sensor assembly 16 and electrical leads 18 from the optical receiving element 17 are electrically connected to circuitry within the shelf-mountable display unit 1. It is preferred for lens 21 and optical receiving element 17 to be arranged in a parallel fashion disposed along the optical centerline 15 of the motion sensor assembly 16.

While not shown, alternate motion sensor arrangements may employ various different and/or additional focusing lenses, target-area definition blinders, or other devices to control actuation of each motion sensor 10, and hence avoid inadvertent activation of powered elements within a shelf-mountable display unit 1. Employing such target-area blinders or lenses, it is also possible to restrict activation sensing to within a predetermined region adjacent to the front of a shelf-mountable display unit 1.

Figure 5:
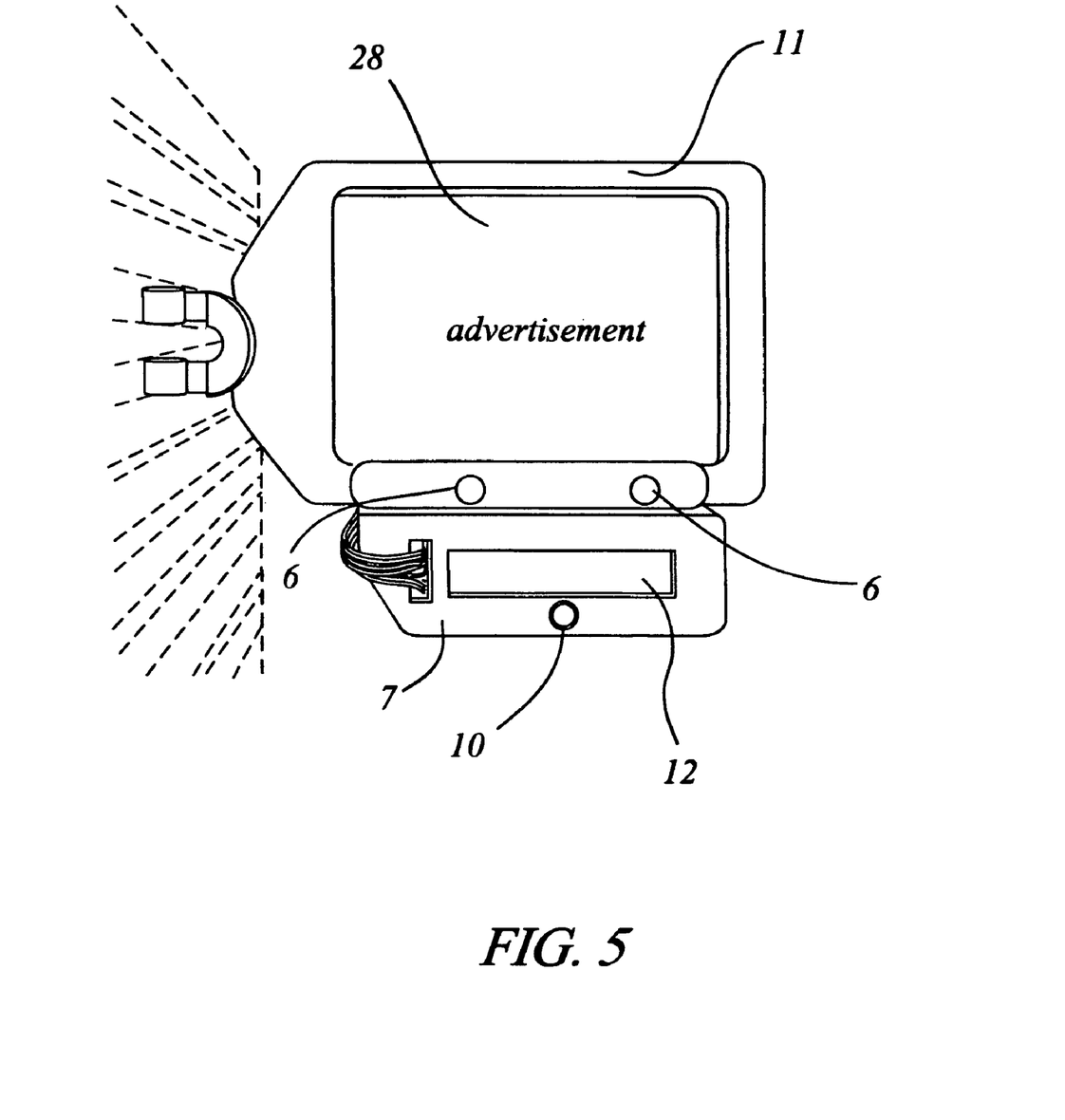
FIG. 5 is a frontal elevation view of another shelf-mountable display unit having display elements and motion sensors thereon.

In other embodiments of the invention, a shelf-mountable display unit 11 could include a product information sheet 28 and display element 12 within a housing 7, as shown in FIG. 5. The shelf-mountable display unit 11 could also include a plurality of product information sheets 28 which are stacked and separately removable by a shopper in a manual fashion. One or more motion sensors 10 could be attached along both sides of the housing 7 so as to sense the presence of a shopper from either direction along an aisle and wake the display element 12 and play a message viewed by the shopper. One exemplary display element 12 is a panel composed of light emitting diodes or the like. The message could be played one or more times or until the motion sensors 10 determine that the shopper is no longer within the target range of the display unit and the display element 12 is returned to its sleep mode. In yet other embodiments, one or more display elements 6 from FIG. 2 could be attached to the housing 7 so as to emit light to better attract and maintain the attention of a shopper.

Figure 9:
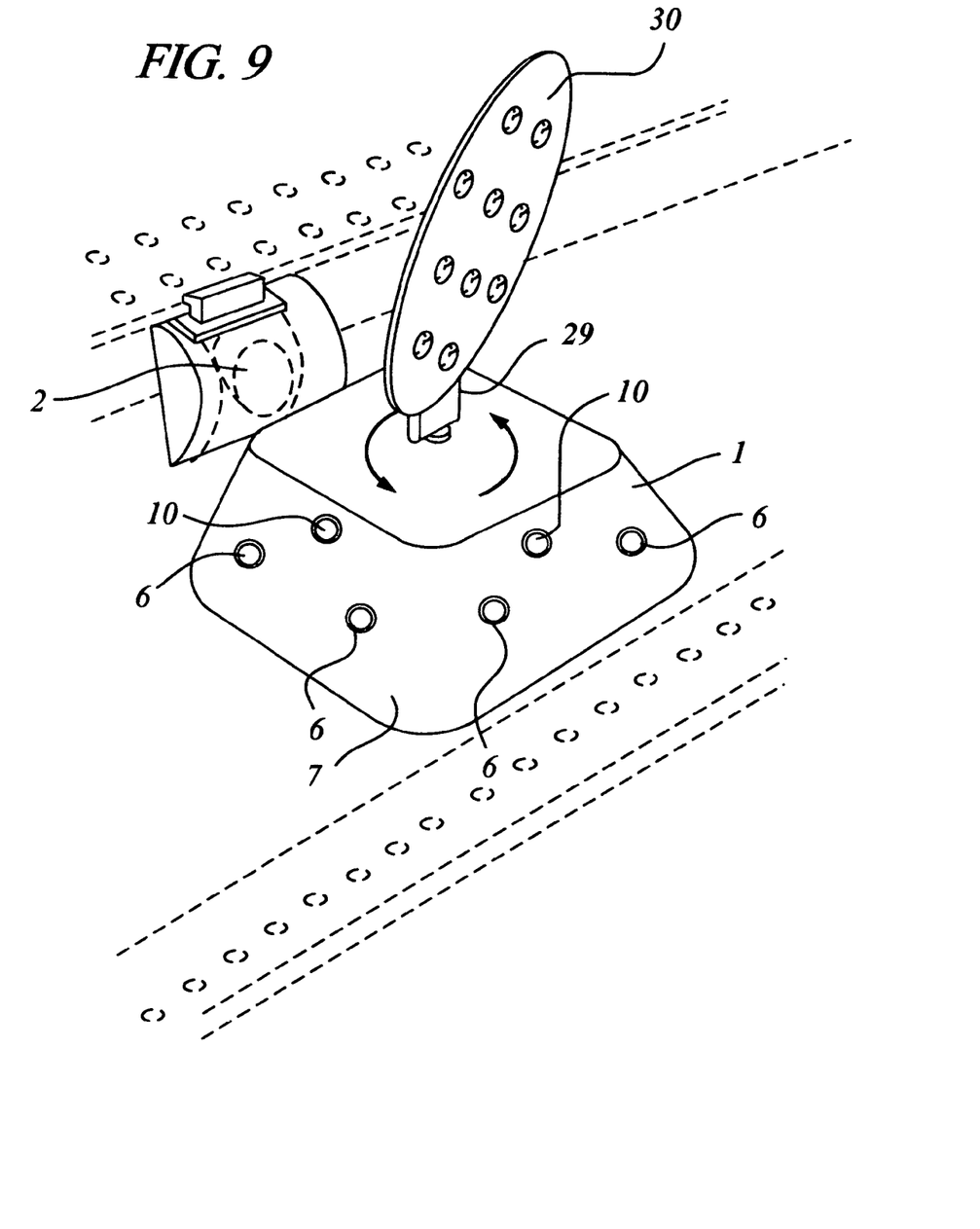
FIG. 9 is an exemplary alternate embodiment wherein motion sensors activate display elements and rotation mechanism with display element disposed along a shelf-mountable display unit.

The motion sensor arrangement described above is likewise applicable to a shelf-mountable display unit 1 having a motorized or mechanized drive which causes a decorative item to move in a fixed or random pattern. Referring now to FIG. 9, a shelf-mountable display unit 1 is shown having a drive device 29 capable of moving a movable display element 30. The drive device 29 could include a battery powered motor which rotates a shaft attached thereto that projects from one surface along a housing 7. The movable display element 30 is attached to the shaft in a removable fashion.

In this embodiment, motion sensors 10 are placed along one or more sides of the housing 7 so as to ensure activation by a shopper. Optional visual display elements 6 could also be placed along one or more sides. When a shopper is within range of a motion sensor 10, the wake up circuit 23 is activated and power is communicated to the drive device 29 and/or display elements 6. The drive device 29 could cause the movable display element to turn along a generally circular or linear path or randomly oscillate so as to communicate a visual queue to a shopper within range of the motion sensors 10. After a predetermined period or when the shopper is no longer within range of the motion sensors 10, power is terminated to the drive device 29 and display elements 6 and the unit is placed into one of the power savings modes described herein.

Figure 10A:
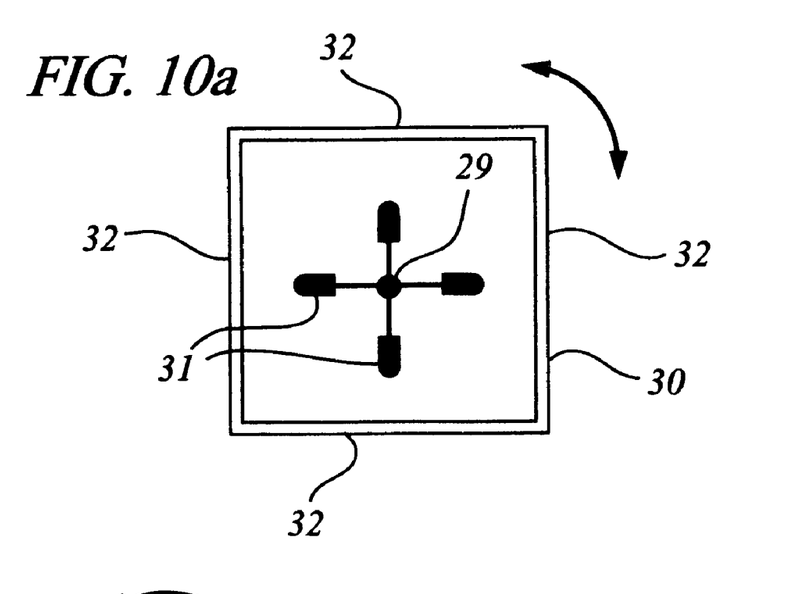
FIG. 10*a* is a top view of another embodiment of the device in FIG. 9 including a square-shaped movable display element with optional lights.
Figure 10B:
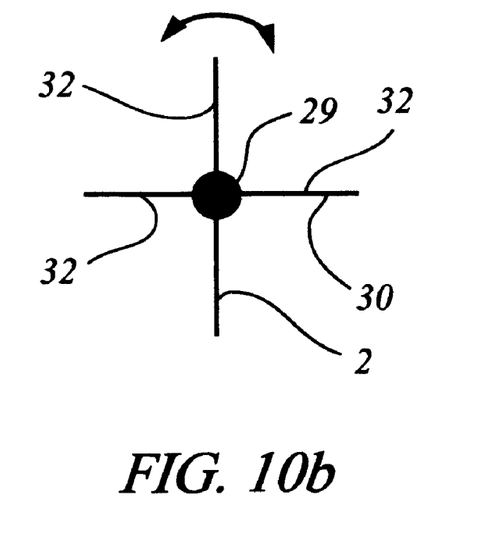
FIG. 10*b* is a top view of another embodiment of the device in FIG. 9 including a movable display element comprising four planar-shaped panels.
Figure 10C:
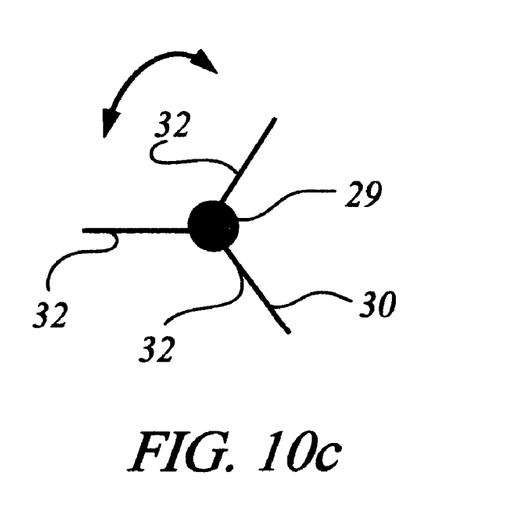
FIG. 10*c* is a top view of another embodiment of the device in FIG. 9 including a movable display element comprising three planar-shaped panels.

The movable display element 30 may include a variety of designs or shapes. For example, FIG. 10a shows a multi-sided movable display element 30 comprised of four planar-shaped panels 32 attached end-to-end and thereafter attached to the drive device 29. Optional lights 31 could also be attached to the drive device 29 so as to backlight the panels 32 when the drive device 29 is powered by circuitry within the shelf-mountable display unit 1. In other embodiments, panels 32 could be arranged in an intersecting pattern, as shown in FIGS. 10b and 10c, about and attached to a shaft-like element projecting from the drive device 29. Panels 32 could be composed of a transparent polymer sheets and have a pocket or recess within which advertizing materials are secured. While planar-shaped panels 32 are preferred, non-planar shapes are also possible. The height, width, length, and shape of each panel 32 are application dependent.

Figure 8:
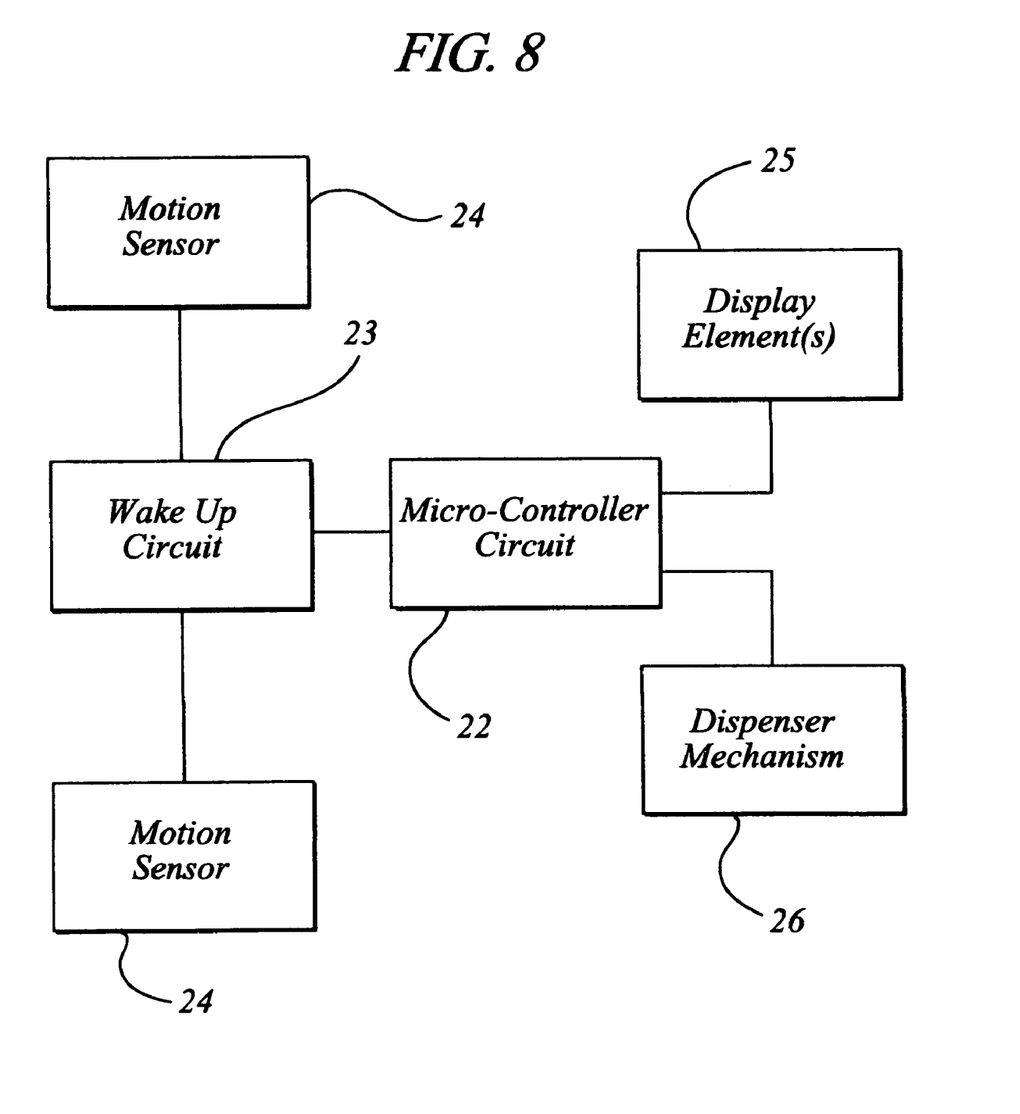
FIG. 8 is a block diagram of the electronic components comprising a motion sensor arrangement according to one embodiment of the invention.

Referring now to FIG. 8, a block diagram is provided for one possible embodiment of a motion sensor arrangement. This diagram is not meant to be exhaustive of the electrical components used within the present invention, but rather is merely illustrative to assist in describing the hardware utilized in the manner described herein. With reference to FIG. 8, display elements 25 are understood to include the display elements 6 in FIG. 2, the display element 12 in FIG. 5, and the movable display element 30 in FIG. 9.

Schematic diagrams of an exemplary, non-limiting, implementation of the electronics and circuitry for the present invention are shown in FIGS. 4A-4F of Provisional Application No. 60/888,040 filed Feb. 2, 2007 with the United States Patent and Trademark Office. A Bill of Materials for exemplary, non-limiting implementations is shown in FIG. 5 of Provisional Application No. 60/888,040 filed Feb. 2, 2007 with the United States Patent and Trademark Office. This circuitry may be modified irrespective of the circuitry in other figures. Circuitry and electronics may be mounted on a single printed circuit board and attached to the housing 7 within any shelf-mountable display unit 1 described herein.

A micro-controller circuit 22 is the primary interface between motion sensors 10 and both display elements 25 and dispenser mechanism 26 housed within a shelf-mountable display unit 1. Furthermore, the micro-controller circuit 22 controls the general operation of the shelf-mountable display unit 1 under at least some element of software of firmware control. For example, the micro-controller circuit 22 controls activation and functionality of the display elements 25 and/or the dispenser mechanism 26. Activation of display elements 25 could include supplying power to one or more display elements 25 so as to emit light, display a static or scrolling message, or move a display object. Functionality of the display elements 25 could include a sequence of ON/OFF commands to operate the display elements 25 in a flashing mode, replay of a message, or move an object in a fixed or random fashion. Activation of the dispenser mechanism 26 could include powering the unit, whereas functionality could include the ejection of a coupon or product information sheet from the unit upon initial recognition of the presence of a person or the sustained presence for a predetermined time interval. Ejection of a coupon or the like could include a lottery-based or random method by which the number of shoppers between ejections is varied. Also, ejection could occur when each shopper is within the detection range of the motions sensors 10. The motion sensor arrangement also includes a wake up circuit 23 with power saving capabilities, which in turn controls motion sensors 24, which interact with the micro-controller circuit 22.

Although there are separate arrows between each component and micro-controller circuit 22 in FIG. 8, two or more of the components may communicate with the micro-controller circuit 22 via a common data bus. The micro-controller circuit 22 may be any suitable controller unit, and is preferably a highly integrated system-on-a-chip for general-purpose applications including a CPU, memory, I/O controller, a SD/MMC memory interface, and embedded SRAM and ROM. By providing a complete set of common system peripherals, a preferable controller unit minimizes overall system costs and eliminates the need to configure additional components while providing high-speed performance of the functions described in this application.

If the shelf-mountable display unit 1 experiences a prolonged period of inactivity, it will preferably go into a sleep mode to conserve power. It will remain in the sleep mode unless woken up by the wake up circuit 23. When movement is detected by one or more motion sensors 24, the wake up circuit 23 takes the device out of sleep mode. When the device is taken out of sleep mode, some pre-defined action may be performed. This pre-defined action may be, for example, the flashing of display elements 25, the display of a message by a panel-type display element 25, or ejection of a coupon or the like from a dispenser mechanism 26. In preferred embodiments, ejection of a coupon or the like would only occur if no other coupon or the like was ejected by the presence of a prior shopper but not retrieved. Motion sensors 24 are preferably at least one of an optical sensor, infrared, radio frequency, or physical sensing device.

In yet other embodiments, the power management circuitry could regulate power to a sensor system within the dispenser mechanism 26 which controls ejection of a coupon or the like. Some coupon dispensers employ a transmitter-receiver system, typically infrared based, aligned about an opening through which a coupon is ejected. When a coupon is partially ejected in the correct or "to be taken position", a black dot printed on the coupon blocks the infrared beam, thus preventing ejection of a subsequent coupon. A typical transmitter-receiver system within a coupon dispenser pulses at a predetermined time interval, typically 1 second, to detect the presence of a partially ejected coupon. Consequently, a transmitter-receiver system drains its power supply needlessly during long intervals when no shoppers are within the range of a shelf-mountable display unit 1.

The addition of one or more motion sensors 24, a wake up circuit 23, and a micro-controller circuit 22 to a dispenser mechanism 26, which automatically dispenses coupons or the like, allows for activation and function of a transmitter-receiver system therein only when a shopper is within range of one or more motion sensors 24, further extending the lifetime of a power supply. For example, in this embodiment the transmitter-receiver system could pulse an infrared source located about an ejection opening every second or more for a predetermined time interval, one example being 15 seconds, after at least one motion sensor 24 detects the presence of a shopper. The transmitter-receiver system would partially eject a coupon only if it is determined that a coupon is not presently positioned for removal. After a predetermined time interval, the dispenser mechanism 26 would be placed into a power saving mode during which the transmitter-receiver system and/or dispenser mechanism 26 would not function.

Since, in use, a shelf-mountable display unit 1 is positioned proximate to a point-of-purchase for consumer goods, and potentially an entire product category, it is preferred that the motion sensors 24 be operational to key off of nearby shoppers with potential product or category interest. Accordingly, the wake up circuit 23 receives information pertaining to light levels that reach the optical receiving element 17 within each motion sensor 24 and calculates whether there is a change within a specific time period. Preferably, the optical receiving element 17 is wired into the wake up circuit 23 in a way so that it will have an output that ranges from 0 volts to 5 volts, or some other known range of voltage or current. Some embodiments may not include a wake up circuit 23 and this function performed by a different integrated circuit or by different circuitry. A significant change in light means a person has been detected which triggers an action, such as light effects and/or the ejection of a coupon.

The photosensitive capability of each motion sensor 24 may also be supplemented by software processing to better detect, not merely when a person comes within range of the device, but whether they are likely to be a shopper or other person coming into range of the device for the first time. For example, it is desired that a person who is stocking items or otherwise working in an aisle and constantly or repeatedly within range of the device would not repetitively trigger the device. To accomplish this goal, software in the device may process the sensor signals depending upon the intervals of detection by the sensor. If the detection interval is sufficiently large, it may be assumed that the person is coming into range and the device should be turned on. If the interval between subsequent detections is small, or there are repeated detections in a short period of time, it may be assumed that the person is not one for whom the device should be awakened from sleep mode, and the device should not be turned on despite a detection of motion by one of the sensors. Furthermore, the logic applied to the sensor signals so that the interval criteria need not always be the same and may be dynamically adjusted during operation of the device. For example, the device can be programmed through software to learn the optimal interval or other criteria that is to be used to determine when the device is awakened from sleep mode, one example being an internal clock with recognition of store restocking or maintenance times.

The electronic components of the display elements 25 and dispenser mechanism 26 preferably receive power from an internal or auxiliary power source rather than an external AC power source, in particular, a plurality of standard, inexpensive alkaline type batteries may be used. These batteries may be one or more AA or D size power storage devices. However, any suitable power source, ranging from lithium-ion batteries, to miniature camera batteries, to solar power or fuel cells, may be used to supply power to the components described herein for the various embodiments of the invention.

Power management is variable within a shelf-mountable display device 1. The present invention is readily adaptable based, upon customer request, to various power supply requests and demands regarding the overall size and shape of the housing 7. As a result, while the use of AA and D-cell batteries is described herein, nothing herein shall limit the disclosure to the same.

Referring again to FIG. 8, the invention could include several power modes to extend the operational lifetime of batteries, power cells, or the like.

A first mode or "green mode" would allow a power chip to operate the device in a semi-sleep mode. In the green mode, power is fed, preferably, only to the motion sensors 24 and motion sensing is used to trigger operation. For the preferred embodiments, the current draw from the power supply by motion sensors 24 would be approximately 120 micro-amps (µA) and preferably lower, thereby conserving power until the display device is triggered. But in some embodiments, other motion sensors 24, such infrared, ultrasonic, and optoelectrical sensors, may have greater current requirements. In the green mode, upon a first sensing of a shopper, the display elements 25 and dispenser mechanism 26 are activated and function. Upon sensing multiple or longer-duration shopper activity, a panel-type display element 12 could display a complete or abbreviated message to conserve power.

A second mode or "operating mode" would allow a shelf-mountable display unit 1 to be fully active and operational, and any operation of the display device triggers the display elements 25 and/or dispenser mechanism 26. Voltage or current of a pre-determined level from the motion sensors 24 will wake up the device from either the green mode or the sleep mode into the operating mode. In this mode, the current burden will be relatively large since it will include that needed for the display elements 25. Nevertheless, in a preferred embodiment, the electronics will use no more than 100 milliamps (mA) in the operating mode.

A third mode or "full-sleep mode" may be provided whereby activation and function of the device is completely OFF based upon a time dependent clock within the device or the like or an ON/OFF button or switch. In this mode, the power savings is at a maximum since even the motion sensors 10 are not operating. This mode may be triggered by a voltage sensor operating across the battery power supply determining that an exceptionally low voltage reading remains on battery life. The device is then forced to enter sleep mode from the green mode or operating mode. Since the motion sensors 10 do not operate in the full-sleep mode, the device will not self-awaken despite the presence of a person within sensor range.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A motion sensor arrangement for a point-of-purchase device comprising:
   (a) at least one motion sensor attachable to a shelf-mountable display unit, said shelf-mountable display unit having a dispenser mechanism that automatically ejects a coupon or a product information sheet from said shelf mountable display unit without physical contact between a person and said shelf-mountable display unit; and
   (b) a power management circuit, said power management circuit causes said dispenser mechanism to operate in different power modes based on said at least one motion sensor determining the presence of said person within the vicinity of said shelf mountable display unit and whether said coupon or said product information sheet has been removed from said shelf mountable display unit.

2. The motion sensor arrangement of claim 1, wherein said at least one motion sensor comprises one or more optical light receiver sensors.

3. The motion sensor arrangement of claim 2, wherein said one or more optical light receiver sensors are angled so as detect motion anywhere within a selected range.

4. The motion sensor arrangement of claim 3, wherein said one or more optical light receiver sensors are angled so as to detect motion when said point-of-purchase device is located on a store shelf.

5. The motion sensor arrangement of claim 1, wherein said at least one motion sensor comprises one or more optical light receiver sensors which are movable and adjustable to work optimally in a given location.

6. The motion sensor arrangement of claim 1, wherein said at least one motion sensor comprises a motion only sensor that detects ambient light variations caused by the interaction between said person and a visible light originating from an overhead light source within a commercial setting, said ambient light variations representative of a shadow.

7. The motion sensor arrangement of claim 6, wherein said at least one motion sensor includes a lens that narrows and sharpens the light within the range of said sensors.

8. The motion sensor arrangement of claim 7, wherein said at least one motion sensor includes target-area definition blinders.

9. The motion sensor arrangement of claim 7, further comprising a photo-resistor, photodiode, phototransistor, or cadmium sulfide cell in combination with said lens.

10. The motion sensor arrangement of claim 1, wherein said power management circuit executes software to improve the accurate detection of said person detected by said at least one motion sensor.

11. The motion sensor arrangement of claim 10, wherein said power management circuit processes signals from said at least one sensor depending upon the intervals of detection by said at least one sensor.

12. The motion sensor arrangement of claim 11, wherein said person is within the range of said motion sensor arrangement when the detection interval is sufficiently large.

13. The motion sensor arrangement of claim 12, wherein said person is not within the range of said motion sensor arrangement when the interval between subsequent detections is small or repeated detections are sensed in a short period of time.

14. The motion sensor arrangement of claim 11, wherein said power management circuit takes said dispenser mechanism out of a low power mode depending on the intervals of detection by said at least one sensor.

15. The motion sensor arrangement of claim 11, wherein said interval criteria can be dynamically adjusted.

16. The motion sensor arrangement of claim 15, wherein said motion sensor arrangement is programmed through software to learn the optimum detection interval.

17. The motion sensor arrangement of claim 1, wherein said power management circuit controls the OFF, ON, and/or functional states of a transmitter-receiver system within said dispenser mechanism. said transmitter-receiver system detects the partial ejection of a coupon or a product information sheet from an opening along said dispenser mechanism.

18. The motion sensor arrangement of claim 1, further comprising:
(c) at least one light emitting device, said power management circuit causes said at least one light emitting device to operate in different power modes based at least in part on the determination of the presence of said person by said at least one motion sensor.

* * * * *